(12) United States Patent
Dharmadhikari et al.

(10) Patent No.: US 9,529,601 B1
(45) Date of Patent: Dec. 27, 2016

(54) MULTI-PROCESSOR STARTUP SYSTEM

(71) Applicant: Dell Products L.P., Round Rock, TX (US)

(72) Inventors: Vivek Dharmadhikari, San Jose, CA (US); James Lawrence Mangin, San Ramon, CA (US); Vinay Sawal, Fremont, CA (US); Russell K. Mukai, Freemont, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/799,789

(22) Filed: Jul. 15, 2015

(51) Int. Cl.
| G06F 9/24 | (2006.01) |
| G06F 15/177 | (2006.01) |
| G06F 9/44 | (2006.01) |
| G06F 13/42 | (2006.01) |

(52) U.S. Cl.
CPC ......... G06F 9/4406 (2013.01); G06F 13/4221 (2013.01)

(58) Field of Classification Search
CPC ............................ G06F 9/4406; G06F 13/4221
USPC ....................................................... 713/1, 2
See application file for complete search history.

(56) References Cited

U.S. PATENT DOCUMENTS

| 5,450,576 | A  | * | 9/1995  | Kennedy | G06F 9/4405 709/222 |
| 7,447,896 | B2 | * | 11/2008 | Smith   | G06F 9/4401 707/999.009 |
| 7,610,479 | B2 | * | 10/2009 | May     | G06F 9/4401 707/999.2 |
| 7,908,470 | B1 | * | 3/2011  | Cavanna | G06F 9/4401 711/1 |
| 7,930,530 | B2 | * | 4/2011  | Roh     | G06F 15/177 455/556.1 |
| 9,122,498 | B2 | * | 9/2015  | Liang   | G06F 12/00 |
| 2012/0072710 | A1 | * | 3/2012 | Gupta   | G06F 9/4405 713/2 |

* cited by examiner

*Primary Examiner* — Mark Connolly
(74) *Attorney, Agent, or Firm* — Haynes and Boone, LLP

(57) ABSTRACT

A switch includes a PCI bus. A line card processor is coupled to a line card memory system and includes a line card processor port connected to the PCI bus. A management processor is coupled to a management memory system and includes a management processor port connected to the PCI bus and associated with a register. The management processor retrieves an OS image and stores the OS image in the management memory system. The management processor then configures the register with a mapping between the management memory system and the line card memory system. The management processor then provides a write instruction to write the OS image to an address range included in the management memory system, and the management processor port converts the write instruction using the address mapping such that the OS image is written over the PCI bus to the line card memory system.

20 Claims, 5 Drawing Sheets

MULTI-PROCESSOR STARTUP SYSTEM

BACKGROUND

The present disclosure relates generally to information handling systems, and more particularly to a startup system for an information handling system with multiple processors.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems include multiple processors. For example, in order to achieve higher port densities, performance, power efficiency, and reliability, networking devices such as switches may include multiple processors (e.g., central processing units (CPUs), network processing units (NPUs), and/or other processing units known in the art) that may be provided on route cards, line cards, and/or other networking subsystems in order to perform tasks such as layer 2 control plane processing, layer 3 control plane processing, line card processing, and/or other networking functions known in the art. In such systems, one of the processors will typically operate as the primary management interface with capabilities to manage directly attached external high speed Ethernet network connectivity, directly attached persistent storage, directly attached external serial console ports, directly attached Universal Serial Bus (USB) ports, management console connections, and/or other management functions known in the art. As such, a primary CPU may act as the designated controller for chassis management, control plane interconnection, fabric interconnection, and redundancy management. The secondary processors and the primary processor are typically connected via Ethernet ports and interconnects, and communicate using Ethernet protocols.

The structure of networking devices including the primary processor and secondary processors discussed above can result in relatively long startup times for the networking device. For example, when such a networking device is powered on or reset, the primary processor will boot up via a Basic Input Output System (BIOS) and load an operating system (OS) image while the secondary processors are held in a reset mode. After reaching the shell prompt, the primary processor may start user space networking services (e.g., a Trivial File Transfer Protocol (TFTP) server daemon) and bring the secondary processors out of reset mode sequentially. Each of the secondary processors may then start up the boot process sequentially by executing BIOS and then utilizing TFTP to download specific OS images from a predefined location that is specified by the primary processor. To ensure that the OS image is reliably downloaded, each packet that is sent using TFTP requires an acknowledgement, resulting in a relatively large latency associated with the process. Furthermore, both the TFTP sender and receiver use the Transport Control Protocol/Internet Protocol (TCP/IP) stack, which also requires acknowledgements, encapsulation, the provisioning of metadata, and other overhead, while the read/write system call nature of copying the OS image for use by the secondary processors further delays the startup of the networking device. Collectively, the time to load and execute an OS image for secondary processors such as route processors and line processors can be on the order of seconds due to the overhead of the Ethernet protocol and software protocols discussed above. For example, it has been found to take up to 30 seconds to download a 30 MB OS image for a route processor or line processor using TFTP as detailed above.

Accordingly, it would be desirable to provide an improved multi-processor system.

SUMMARY

According to one embodiment, a multi-processor startup system includes a Peripheral Component Interconnect (PCI) bus; a secondary processing system that is coupled to a secondary memory system and that includes a secondary processing system port that is connected to the PCI bus; a primary processing system that is coupled to a primary memory system and that includes a primary processing system port that is connected to the PCI bus and that is associated with at least one primary port register, wherein the primary processing system is configured to: retrieve a secondary processing system operating system (OS) image and store the secondary processing system OS image in the primary memory system; configure the at least one primary port register with an address mapping between the primary memory system and the secondary memory system; and copy the secondary processing system OS image to the secondary memory system by providing a write instruction to write the secondary processing system OS image to an address range included in the primary memory system, wherein the primary processing system port converts the write instruction using the address mapping such that the secondary processing system OS image is written over the PCI bus to the secondary memory system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
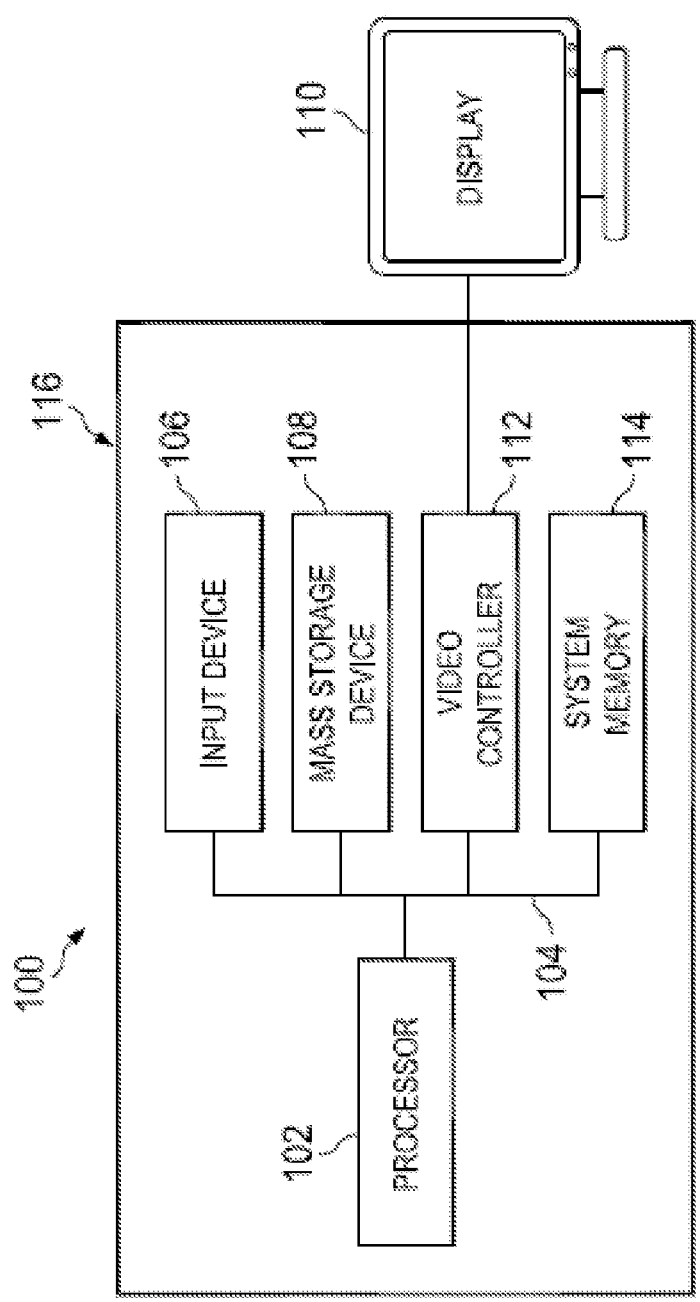
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
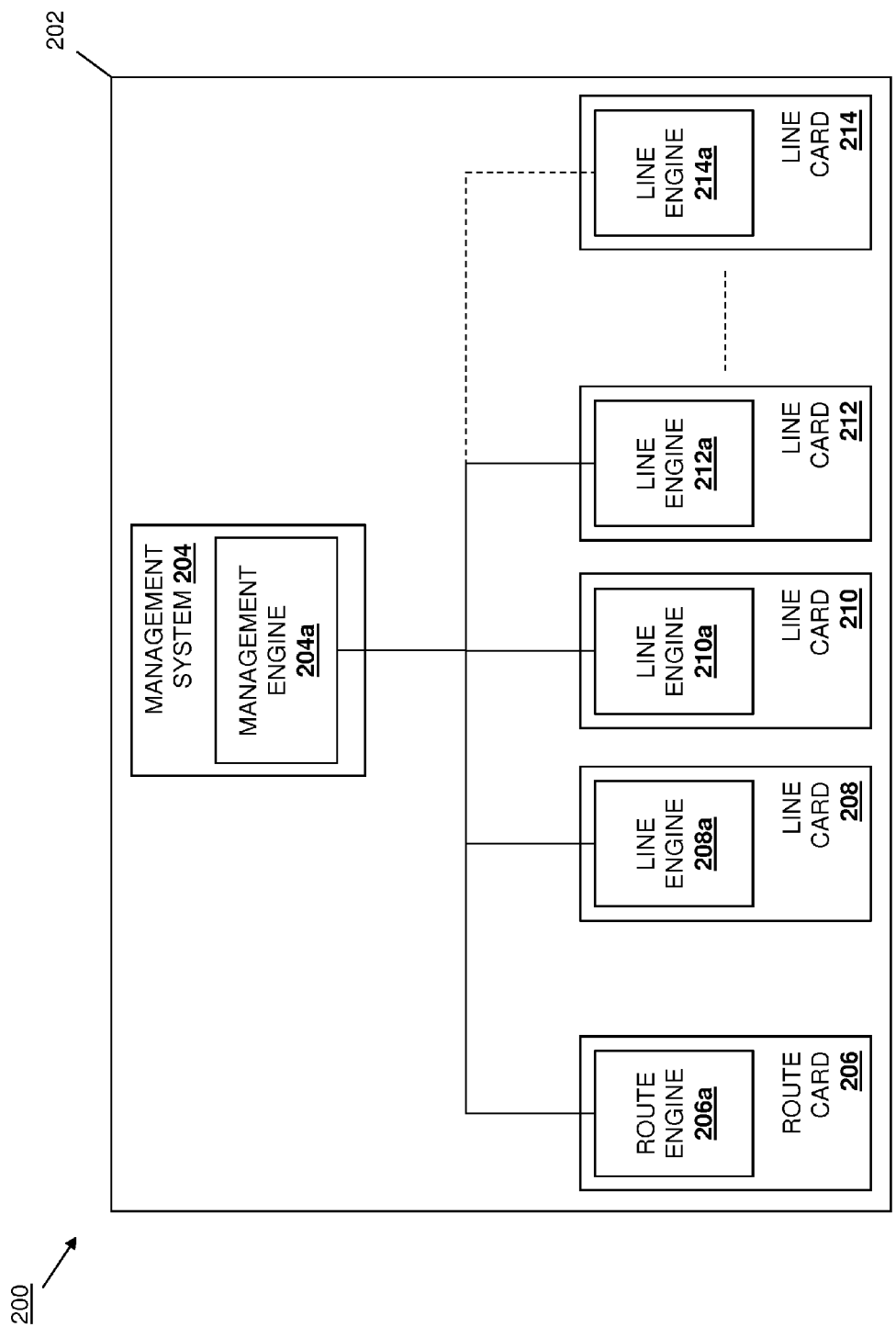
FIG. 2 is a schematic view illustrating an embodiment of a multi-processor system.

Referring now to FIG. 2, an embodiment, of a multi-processor system 200 is illustrated. In an embodiment, the multi-processor system 200 may be the IHS 100 discussed above with reference to FIG. 1, and/or may include some or all of the components of the IHS 100. In the embodiment of FIG. 2, the multi-processor system 200 is illustrated and described as a networking device such as a switch. However, the teaching of the present disclosure will be beneficial to a variety of other multi-processor systems known in the art, and thus their application to such systems is envisioned as falling within the scope of the present disclosure. In the illustrated embodiment, the multi-processor system 200 includes a chassis 202 that houses the components of the multi-processor system 200. For example, the chassis 202 in the embodiment illustrated in FIG. 2 houses a management system 204 that is coupled to a route card 206 and a plurality of line cards 208, 210, 212, and up to 214. One of skill in the art will recognize that the management system 204, route card 206, and line cards 208-214 are components typically found in networking devices such as switches, and different numbers and configurations of route cards and line cards, as well as other components, may be provided in the chassis 202 while remaining within the scope of the present disclosure.

As discussed in further detail below, each of the management system 204, route card 206, and line cards 208-214 may include processing systems (not illustrated, but which may be the processor 102 discussed above with reference to FIG. 1) and memory systems (not illustrated, but which may be the system memory 114 discussed above with reference to FIG. 1) that include instructions that, when executed by the processing systems, cause the processing systems to provide engines that perform the functions of the management system 204, route card 206, and line cards 208-214, respectively. For example, the route card 206 includes a route engine 206a, each of the line cards 208-214 include respective line engines 208a-214a, and the management system 204 includes a management engine 204a that is coupled to each of the route engine 206a and the line engines 208a-214a (e.g., via connections between the respective processing systems that provide those engines). While the functionality discussed below for the engines 204a-214a is directed to the multi-processor startup taught herein, one of skill in the art in possession of the present disclosure will recognize that the management engine 204a, the route engine 206a, and the line engines 208a-214a may include other functionality that provides for the conventional functioning of networking devices such as switches while remaining within the scope of the present disclosure. Furthermore, while the processing system used to provide the management engine 204a is described below as a primary processing system, and the processing systems used to provide the route engine 206a and line engines 208a-214a are described below as a secondary processing system, one of skill in the art in possession of the present disclosure will recognize that different processing systems may provide the primary and secondary processing systems discussed below while remaining within the scope of the present disclosure.

Figure 3:
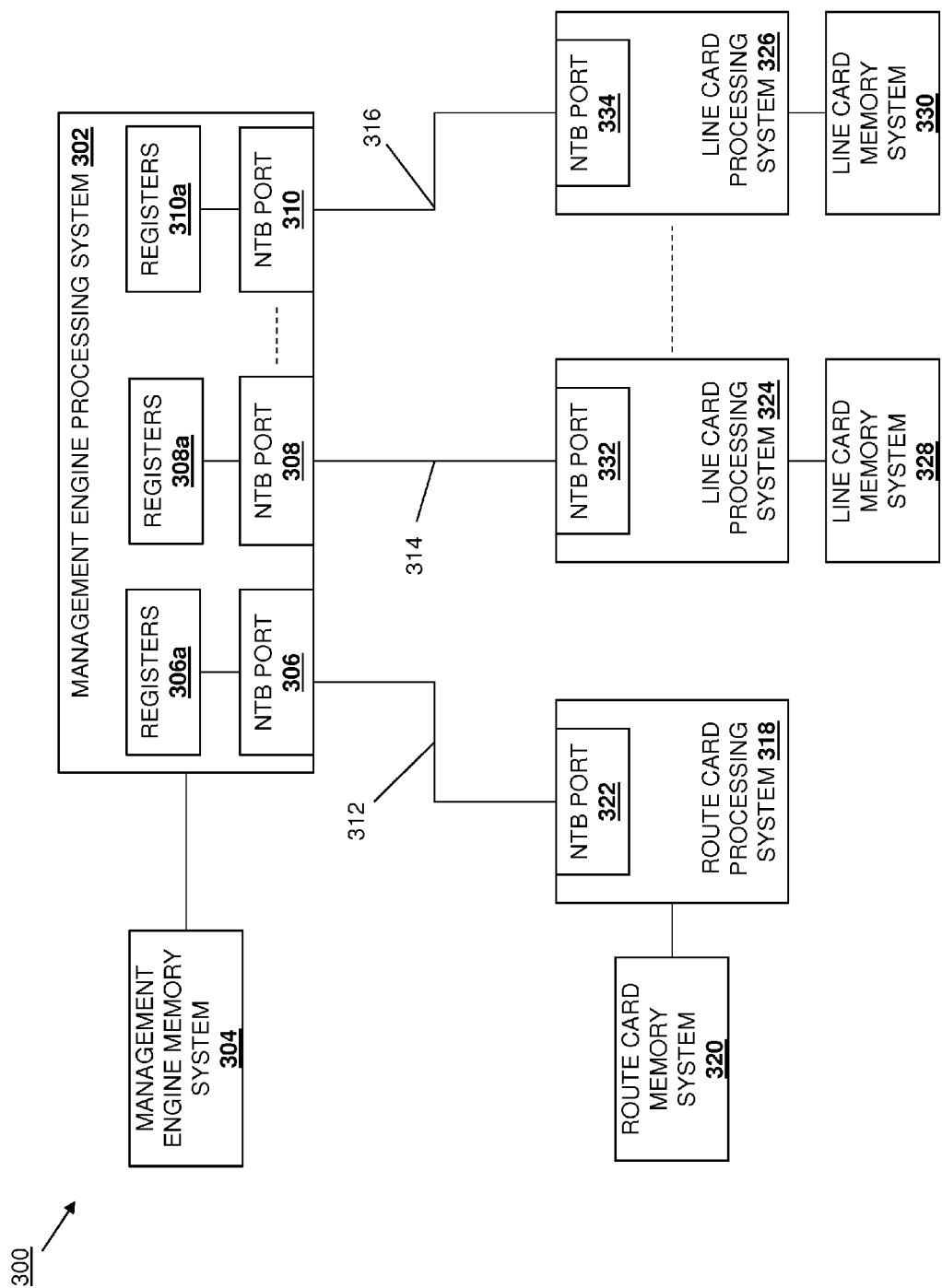
FIG. 3 is a schematic view illustrating an embodiment of the multi-processor system of FIG. 2.

Referring now to FIG. 3, an embodiment of a multi-processor system 300 is illustrated. In an embodiment, the multi-processor system 300 may be used to provide the multi-processor system 200 discussed above with reference to FIG. 2, and thus may be housed in the chassis 202. As such, the multi-processor system 300 may be the IHS 100 discussed above with reference to FIG. 1, and/or may include some or all of the components of the IHS 100. The multi-processor system 300 includes a primary processing system that includes a primary processor and that is illustrated as a management engine processing system 302, and a primary memory system that may include a primary memory device and that is illustrated as a management engine memory system 304. As discussed above, the management engine processing system 302 and the management engine memory system 304 may provide the management engine 204a discussed above with reference to FIG. 2, and in some embodiments may be configured to operate as a primary management interface for the multi-processor system 300 (e.g., a control processor) that acts as a designated controller for chassis management, control plane interconnection, fabric interconnection, redundancy management, and/or other management features known in the art.

The primary processing system in the multi-processor system 300 includes a plurality of primary processor ports that, in the illustrated embodiment, are Non-Transparent Bridge (NTB) ports 306, 308, and up to 310 that are included on the management engine processing system 302 (e.g., provided on the primary processor) and connected to Peripheral Component Interconnect express (PCIe) interconnects 312, 314, and 316, respectfully that may be provided in one or more PCIe buses. While discussed below as PCIe, the PCIe interconnects 312, 314, and 316 and PCIe bus may be PCI interconnects and a PCI bus while remaining within the scope of the present disclosure. Furthermore, in other embodiments, other types of ports are envisioned as falling within the scope of the present disclosure. Each of the NTB ports 306-310 are coupled to one or more respective primary/management/NTB port registers 306a, 308a, and 310a. In an embodiment, each of the one or more registers for each NTB port 306-310 may include NTB port Base Address Registers (BARs), NTB port Address Translate Registers (ATRs), NTB message registers, NTB doorbell registers, and/or other registers known in the art. Each NTB port 306, 308, and 310 may be associated with its respective registers 306a, 308a, and 310a (e.g., in the management engine memory system 304), and other information about the NTB ports 306-310 may be associated with those NTB ports 306-310 as well.

The multi-processor system 300 includes a plurality of secondary processing systems that each include a secondary processor and that are each coupled to a respective secondary memory system that may include a secondary memory device. One of those secondary processing systems/secondary memory systems is illustrated as a route card processing system 318 that may include a route card processor that is coupled to a route card memory system 320. As discussed above, the route card processing system 318 and the route card memory system 320 may provide the route engine 206a discussed above with reference to FIG. 2 that is configured to perform routing functions known in the art. The route card processing system 318 includes a secondary processor port that, in the illustrated embodiment, is an NTB port 322 that is included on the route card processing system 318 (e.g., provided on the second processor), connected to the PCIe interconnect 312, and associated with one or more registers (not illustrated, but similar to the registers 306a, 308a, and 310a discussed above).

Others of those secondary processing systems/secondary memory systems are illustrated as line card processing systems 324 and up to 326 that may each include a line card processor that is coupled to line card memory systems 328 and up to 330, respectively. As discussed above, the line card processing systems 324 and 326, and the line card memory systems 328 and 330, respectively, may provide the respective line engines 208a-214a discussed above with reference to FIG. 2 that are configured to perform line card functions known in the art. The line card processing systems 324 and 326 each include a secondary processor port that, in the illustrated embodiment, is an NTB port 332 that is included on the line card processing system 324 (e.g., provided on the second processor), connected to the PCIe interconnect 314, and associated with one or more registers (not illustrated, but similar to the registers 306a, 308a, and 310a discussed above); as well as an NTB port 334 that is included on the line card processing system 326 (e.g., provided on the second processor), connected to the PCIe interconnect 316, and associated with one or more registers (not illustrated, but similar to the registers 306a, 308a, and 310a discussed above). Thus, the primary processing system and/or processor may be connected to the secondary processing systems and/or processors through NTB ports and PCIe interconnects. As discussed below, the multi-processor system 300 provides an embodiment where the each secondary processing system is directly connected to the primary processing system via a respective NTB port on the primary processing system which, as discussed below, may allow for the startup functions discussed below to be performed for each secondary processing system in parallel.

Figure 4:
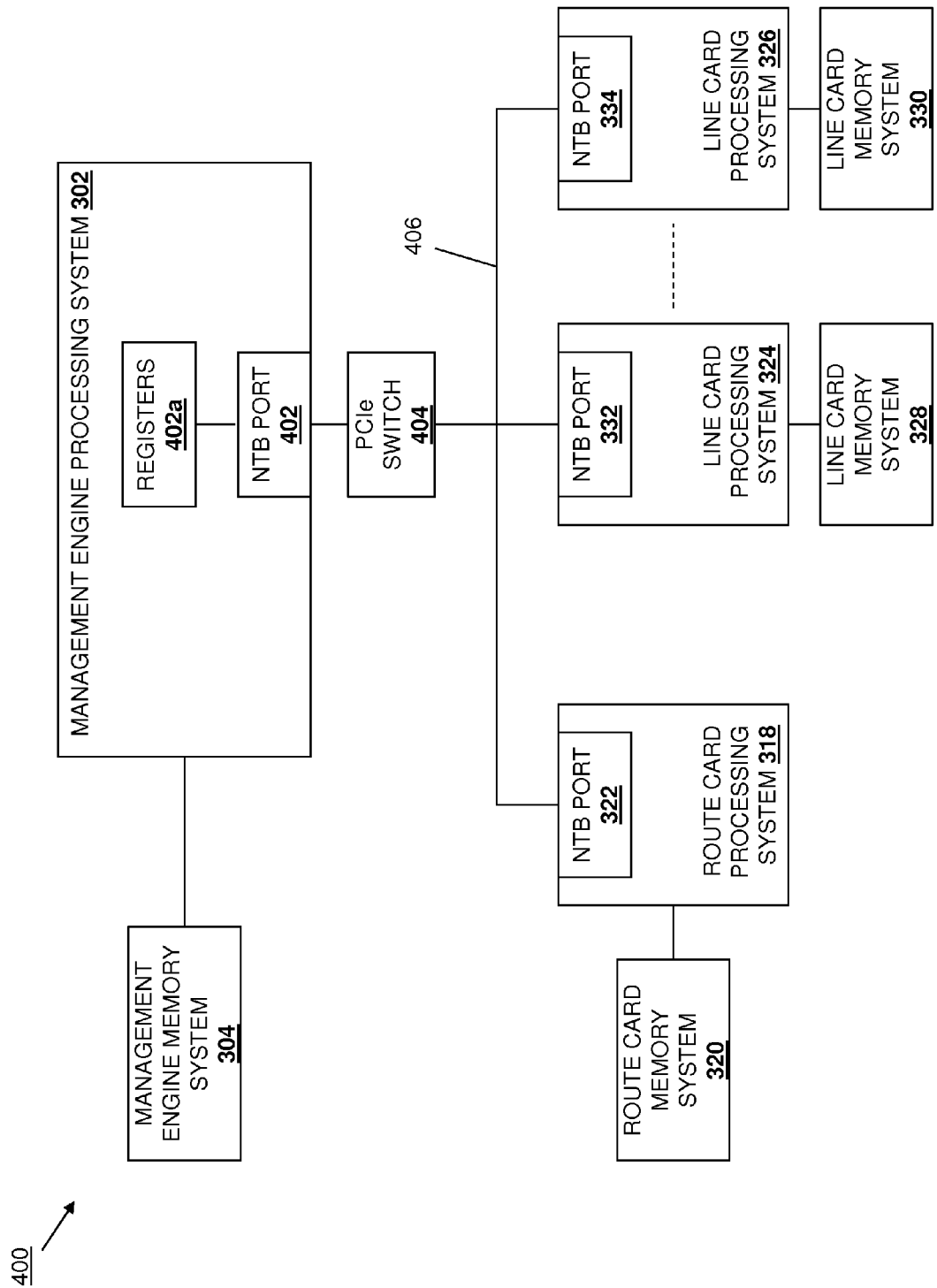
FIG. 4 is a schematic view illustrating an embodiment of the multi-processor system of FIG. 2.

However, in some embodiments, the multi-processor system may include more secondary processors than there are primary processor ports on the primary processing system or processor. For example, FIG. 4 illustrates an embodiment of a multi-processor system 400 that includes more secondary processing systems than there are NTB ports on the primary processing system. The multi-processor system 400 is similar to the multi-processor system 300 discussed above with reference to FIG. 3, and includes similar reference numbers for similar components. For example, each of the management engine memory 304, the route card processing system 318/route card memory system 320, line card processing system 324/line card memory system 328, and the line card processing system 326/line card memory system 330 may be substantially similar to those discussed above with reference to FIG. 3. However, the management engine processing system 302 in the multi-processor system 400 includes an NTB port 402 that is associated with and connected to one or more registers 402a. The NTB port 402 and one or more registers 402a are substantially similar to the NTB ports 306-310 and one or more registers 306a-310a discussed above.

However, as can be seen, the management engine processing system 302 in the multi-processor system 400 includes fewer NTB ports than secondary processing systems (i.e., a single NTB port for the plurality of secondary processing systems, as compared to the one-to-one NTB port/secondary processing system ratio in the multi-processor system 300 of FIG. 3.) The NTB port 402 on the management engine processing system 302 is coupled to each of the NTB ports 322, 332, and 334 on the route card processing system 318 and the line card processing systems 324 and 326 by a PCIe switch 404 that is coupled to a PCIe bus 406 that connects to each of the NTB ports 322, 332, and up to 334. As discussed below, the use of the PCIe switch 404 to couple the NTB port 402 to the NTB ports 322, 332, and/or to 334 may result in the startup functions discussed below being performed for each secondary processing system in series. However, one of skill in the art in possession of the present disclosure will recognize that the number of NTB ports on a processing system may vary, and thus primary processing systems may be selected based on such one-to-one NTB port/secondary processing system relationships or one-to-many NTB port/secondary processing system relationships as is desired or dictated by the multi-processor system in which they are incorporated. Furthermore, combinations of one-to-one and one-to-many NTB port/secondary processing system relationships may be provided when the primary processing system includes a plurality of NTB ports, but the multi-processor system still includes a number of secondary processing systems that exceed the number of those NTB ports. In such scenarios, relatively high-priority secondary processing systems may be connected directly to NTB ports on the primary processing system, while a plurality of relatively low-priority secondary processing systems may be coupled to a PCIe switch that is connected to one of the NTB ports on the primary processing system.

Figure 5:
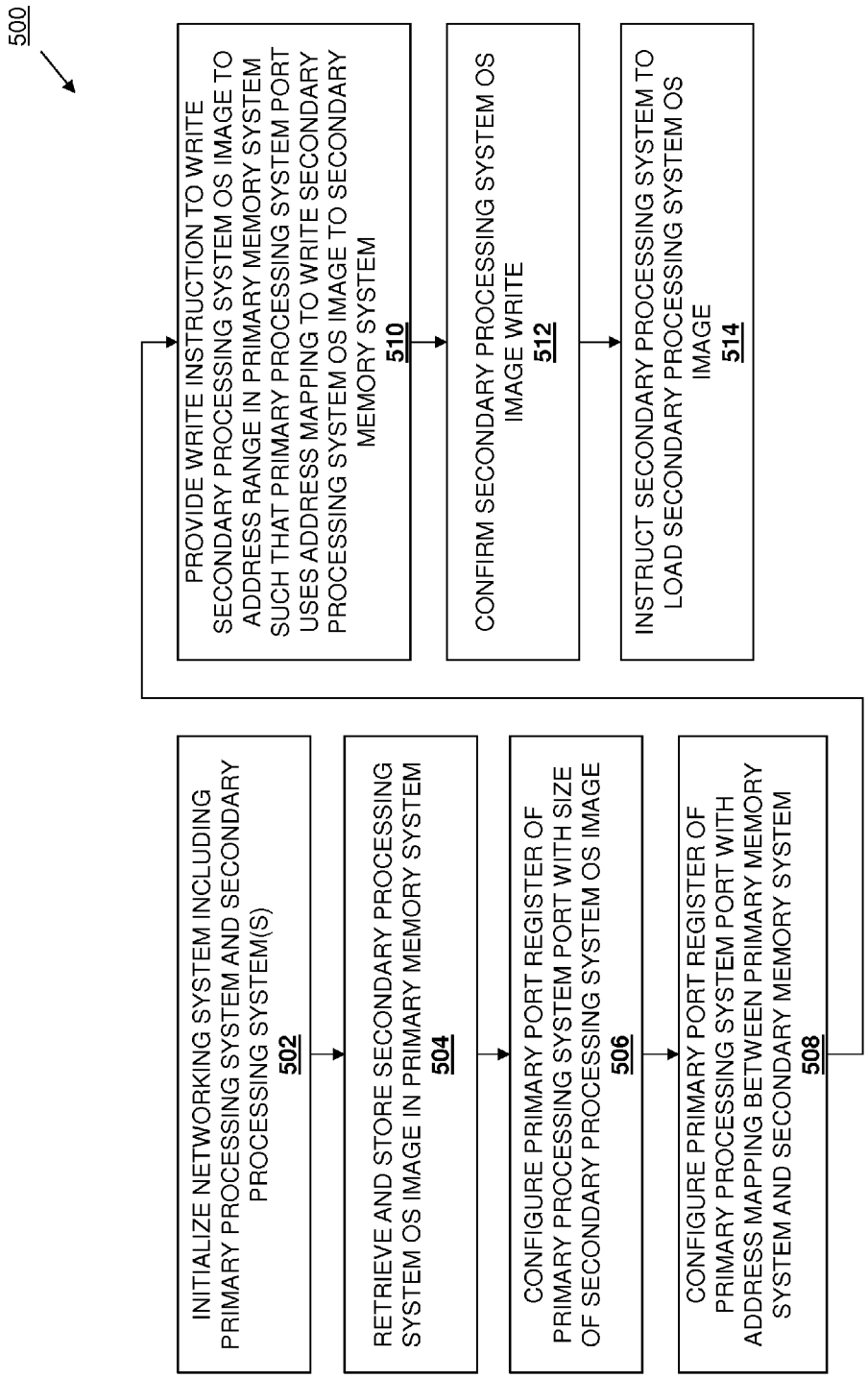
FIG. 5 is a flow chart illustrating an embodiment of a method for starting up a multi-processor system.

Referring now to FIG. 5, an embodiment of a method 500 for starting up a multi-processor system is illustrated. As discussed above, in conventional multi-processor systems, the startup time (e.g., the time it takes the system processors to boot up their operating system (OS) images and come online or otherwise be ready for use) can be relatively large (e.g., on the order of several minutes). For example, in response to power on or reset of the system, the primary processor will boot up via the BIOS and use a boot-loader to load its OS image from a local hard drive or through a network. During the time the primary processor loads its OS image, the secondary processors are held in a reset mode. Once the primary processor reaches the shell prompt, it starts networking services (e.g., a TFTP server daemon) and brings the secondary processors out of reset mode sequentially. Each secondary processor brought out of reset mode will then start the boot up process by executing BIOS and using TFTP to download its respective OS image from a predefined location specified by the primary processor. In conventional multi-processor systems, standard Ethernet switching and Ethernet protocols are used to transfer data to the secondary processors and/or their memory systems, so depending on the link bandwidth and protocol transfer rate, this process can take a few seconds to several dozens of seconds, and as discussed above it is repeated sequentially for each of the secondary processors, further adding to the system startup/boot up time.

The relatively large startup times for such conventional multi-processor systems are a result of several of the factors discussed above. For example, the Ethernet protocol does not support automatic packet acknowledgement, and relies on the use of software to ensure data transfer reliability, resulting in the use of TFTP to transfer OS images to the secondary processors. TFTP provides for an acknowledgement for each packet of the OS image that is sent, introducing latency into the OS image transfer process. In addition, the use of the TCP/IP stack, which is a connection oriented, fully acknowledged protocol that includes encapsulation and metadata generation/inclusion in headers, introduces further overhead as well. Finally, the conventional copy nature of read/write systems calls in such conventional multi-processor systems results in the moving of data between a user space and the system by copying the data to a kernel buffer and then using direct memory access or programmed input/output to read and write data to the system (i.e., the TFTP server in the primary processor repeatedly invokes read and write systems calls to read and write data to and from memory systems for the secondary processors during the startup operations).

As discussed below, the method 500 and systems described herein provides a hardware/software architecture that can reduce the startup time of multi-processor systems by an order of magnitude (e.g., from several seconds to a few micro-seconds). Such startup time reductions are provided by bypassing the Ethernet protocol as an interconnect between the primary and secondary processors, as well as bypassing TFTP and the TCP/IP stack as a transport protocol, and instead using one or more PCIe interconnects to connect the primary processor and secondary processors in the multi-processor system. As discussed above, for systems with a relatively low number of secondary processors, the primary and secondary processors may be interconnected directly via the PCIe interconnects using their integrated PCI controllers, while for systems with a relatively high number of secondary processors, a PCIe switch may be used with the PCIe interconnects to provide the coupling between the integrated PCI controllers in the primary and secondary processors. The use of processor ports such as the NTB ports discussed above allow for the mapping of the secondary memory systems for the secondary processors into the address space of the primary memory system for the primary processor, which allows for the bypassing of the TCP/IP stack and system call overhead discussed above. As such, data transfer between the primary processor and the secondary processors may be performed using a memory copy ("memcpy"), and a software "handshake" method may be used to verify, synchronize, or otherwise ensure that OS images transferred to the secondary processors are complete and ready for use by the secondary processors.

The method 500 begins at block 502 where a networking system including a primary processing system and secondary processing system(s) is initialized. In an embodiment, the multi-processor system 200 (which may be provided by the multi-processor systems 300 and/or 400) is powered on, started up, reset, and/or otherwise initialized at block 502. In response to initialization of the multi-processor system 200, the management engine 204a provided on the management system 204 (e.g., the primary processing system) and each of the route engine 206a provided on the route card 206 and the line engines 208a-214a provided on the line cards 208-214 (e.g., the secondary processing systems) boot up and execute their respective BIOS. In an embodiment, each of the management engine 204a, the route engine 206a, and the line engines 208a-214a may boot up in parallel and execute their respective BIOS.

The method 500 then proceeds to block 504 where secondary processing system OS images are retrieved and stored in the primary memory system. In an embodiment, the management engine 204a provided on the management system 204 (e.g., the primary processing system) retrieves the OS images for each of the route engine 206a provided on the route card 206 and the line engines 208a-214a provided on the line cards 208-214 (e.g., the secondary processing systems) from a local hard drive on the multi-processor system 200 or over a network using a communication system in the multi-processor system 200. In an embodiment, at block 504 the management engine 204a may decode each of the retrieved OS images and determine a size of that OS image and a checksum for that OS image (referred to below as a "retrieved checksum" of the retrieved OS image) for use later in method 500 as discussed below.

The method 500 then proceeds to block 506 where a primary port register of the primary processing system is configured with the size of the secondary processing system OS image. In an embodiment, the management engine 204a provided in the management system 204 (e.g., the primary processing system) may be used (e.g., by a user or administrator) to configure one or more port registers (e.g., the primary port registers) in the management system 204 with the size of the OS images retrieved at block 504. For example, with reference to FIG. 3, at block 506 the management engine processing system 302 may configure a BAR in the registers 306a for the NTB port 306 with the size of the OS image for the route card processing system 318, configure a BAR in the registers 308a for the NTB port 308 with the size of the OS image for the line card processing system 324, and configure a BAR in the registers 310a for the NTB port 310 with the size of the OS image for the line card processing system 326. In another example, with reference to FIG. 4, at block 506 the management engine processing system 302 may configure BARs in the registers 402a for the NTB port 402 with the size of the OS image for the route card processing system 318, the size of the OS image for the line card processing system 324, and the size of the OS image for the line card processing system 326. In an embodiment, the configuration of the BAR in the registers for the NTB ports of the primary processing system is performed prior to PCI enumeration. As would be understood by one of skill in the art in possession of the present disclosure, the configuration of the BAR in the registers for the NTB ports of the primary processing system may be used to limit the size of the memory window provided between the primary processing system and the secondary processing systems and discussed in further detail below.

The method 500 then proceeds to block 508 where the primary port register of the primary processing system is configured with an address mapping between the primary port memory system and the secondary memory system. In an embodiment, the management engine 204a provided in the management system 204 (e.g., the primary processing system) may be used (e.g., by a user or administrator) to configure one or more port registers (e.g., the primary port registers) in the management system 204 with an address mapping between the memory of the management system 204 (e.g., the primary memory system) and the memory of the route card 206 and the line cards 208-214 (e.g., the secondary memory systems). For example, with reference to FIG. 3, at block 508 the management engine processing system 302 may configure an address translate register in the registers 306a for the NTB port 306 with an address mapping between the management engine memory system 304 and the route card memory system 320, configure an address translate register in the registers 308a for the NTB port 308 with an address mapping between the management engine memory system 304 and the line card memory system 328, and configure an address translate register in the registers 310a for the NTB port 310 with an address mapping between the management engine memory system 304 and the line card memory system 330. In another example, with reference to FIG. 4, at block 508 the management engine processing system 302 may configure address translate registers in the registers 402a for the NTB port 402 with address mappings between the management engine memory system 304 and the route card memory system 320, between the management engine memory system 304 and the line card memory system 328, and between the management engine memory system 304 and the line card memory system 330.

In an embodiment, the address mappings configured at block 508 operate to direct access by the management engine processing system 302 to the BARs in its NTB port(s) to the secondary memory systems connected to those NTB port(s). For example, a BAR in an NTB port may include a value 0x40000 and a size of 64 KB, and the address translate register may be initialized with a value of 0x50000. In such an example, when the management engine processing system 302 accesses an address between 0x40000 and 0x4FFFF, that access will be captured by the NTB port and converted to an access of the secondary memory systems between 0x50000 and 0x50FFFF according to the address mapping. In an embodiment, the address translate registers may be programmed with the load address of the OS images for the route card processing system 318 and the line card processing systems 324 and 326, which creates "address domains" in the primary memory system 304 such as a primary processing system domain, a route card processing system domain, and line card processing domains, and permits the primary processing system to access each of the route card memory system 320 and the line card memory systems 328 and 330, as discussed below.

In some embodiments, following the configuration of the primary port register(s) at block 506 and 508, the primary processing system may begin PCI enumeration, discover the NTB ports, and note the address ranges provided in the registers for each NTB port. As discussed above, each NTB port in the management engine processing system 302 may include an address range in one of its registers that is associated with one of the secondary memory systems for a second processing system. Thus, with reference to FIG. 3, management engine processing system 302 may begin PCI enumeration, discover the NTB port 306 and note the address range included in its registers 306a for the route card memory system 320, discover the NTB port 308 and note the address range included in its registers 308a for the line card memory system 328, and discover the NTB port 310 and note the address range included in its registers 310a for the line card memory system 330. Similarly, with reference to FIG. 4, management engine processing system 302 may begin PCI enumeration, discover the NTB port 402, and note the address ranges included in its registers 402a for the route card memory system 320, the line card memory system 328, and the line card memory system 330.

The method 500 then proceeds to block 510 where write instructions are provided to write a secondary processing system OS image to an address range in the primary memory systems such that the primary processing system port uses the address mapping to write the secondary processing system OS image to the secondary memory system. In an embodiment, with reference to FIG. 3, the management engine 204a provided in the management system 204 (e.g., the primary processing system) provides a write instruction (e.g., by invoking a "memcpy" Application Programming Interface (API)) to copy the secondary processing system OS image to an address range in the primary memory system that is included in the BAR of the registers 306a for the NTB port 306, and the NTB port 306 will use the address mapping provided in the address translate register of the registers 306a to write the second processing system OS image to the route card memory system 320 (e.g., the secondary memory system). For example, the write instruction may be provided via the pseudocode:

"memcpy(BAR Address, secondary_processing_system_OS_image_address, secondary_processing_system_OS_image_size)."

As would be understood by one of skill in the art in possession of the present disclosure, write instructions such as memcpy do not use protocols such as TFTP, TCP, or IP. Rather, the hardware in the NTB port 306 will capture the write packets initiated by the write instruction to the management engine memory system 304 and convert that write instruction into a write to the route card memory system 320 (e.g., the secondary memory system) using the address translation register in the registers 306a. As such, in some embodiments, the hardware in the NTB port 306 may handle the read/write request completely in hardware and without the use of software.

Similarly, the management engine 204a may provides a write instruction (e.g., by invoking a "memcpy" API) to copy the secondary processing system OS image to an address range in the primary memory system that is included in the BAR of the registers 308a for the NTB port 308, and the NTB port 308 will use the address mapping provided in the address translate register of the registers 308a to write the second processing system OS image to the line card memory system 328 (e.g., the secondary memory system). Also similarly, the management engine 204a may also provide a write instruction (e.g., by invoking a "memcpy" API) to copy the secondary processing system OS image to an address range in the primary memory system that is included in the BAR of the registers 310a for the NTB port 310, and the NTB port 310 will use the address mapping provided in the address translate register of the registers 310a to write the second processing system OS image to the line card memory system 330 (e.g., the secondary memory system). With reference to FIG. 4, the management engine 204a may provide a write instruction (e.g., by invoking a "memcpy" API) to copy secondary processing system OS images to address ranges in the primary memory system that are included in the BARs of the registers 402a for the NTB port 402, and the NTB port 402 will use the address mappings provided in the address translate registers of the registers 402a to write the second processing system OS image to the route card memory system 320 and the line card memory systems 328 and 330 (e.g., the secondary memory systems) using the PCIe switch 404. While the embodiments of block 510 discussed above discuss the primary processing system writing the secondary processing system OS images to the secondary memory systems (using the NTB ports), in other embodiments, the secondary processing systems may retrieve the secondary processing system OS images from the primary memory system of the primary processing system and write those secondary processing system OS images to their secondary memory systems using similar techniques as discussed above.

The method 500 then proceeds to block 512 where the writing of the secondary processing system OS image is confirmed. In an embodiment, at block 512, the secondary processing systems may determine a checksum (referred to below as a "written checksum" of the written OS image) of the secondary processing system OS image that was written to their secondary memory systems, and configure a register associated with their secondary processing ports with the written checksum. For example, the route card processing system 318 may configure a register (not illustrated, but similar to the registers associated with the NTB ports in the management engine processing system 302) associated with its NTB port 322 with the written checksum for the secondary processing system OS image written to its route card memory system 320, the line card processing system 324 may configure a register (not illustrated, but similar to the registers associated with the NTB ports in the management engine processing system 302) associated with its NTB port 332 with the written checksum for the secondary processing system OS image written to its line card memory system 328, and the line card processing system 326 may configure a register (not illustrated, but similar to the registers associated with the NTB ports in the management engine processing system 302) associated with its NTB port 334 with the written checksum for the secondary processing system OS image written to its line card memory system 330.

Following the configuration of their registers associated with the secondary processing system ports, the secondary processing systems may then send a notification to the primary processing system. For example, the route card processing system 318, the line card processing system 324, and the line card processing system 326 may configure PCI doorbell registers associated with their NTB ports 322, 332, and 334, respectively, in order to send an interrupt to the management engine processing system 302. In response to receiving the notification, the primary processing system may confirm the writing of the secondary processing system OS image. For example, upon receiving a door-bell register event from the NTB ports 322, 332, and 334, the management engine processing system 302 may read the written checksums included in the message registers of the NTB ports 322, 332, and 334, and compare those written checksums with the respective received checksums determined as discussed above. As would be understood by one of skill in the art in possession of the present disclosure, the comparison of a received checksum for a secondary processing system OS image received by the primary processing system, and a written checksum for that secondary processing system OS image that is written to a secondary memory system for a secondary processing system, allows for the determination of whether the secondary processing system OS image that was received by the primary processing system was properly written to the secondary memory system. In response to the written checksum not matching the received checksum, the primary processing system may attempt to retransmit the secondary processing system OS image some predetermined number of times (which may be user configurable) after which they primary processing system may abort the transmission of the secondary processing system OS image and notify the user of the failure.

The method 500 then proceeds to block 514 where the secondary processing system is instructed to load the secondary processing system OS image. In an embodiment, in response to the written checksum matching the received checksum at block 512, the primary processing system may then instruct the secondary processing systems to load their respective secondary processing system OS images. For example, the management engine processing system 302 may configure message registers in the registers 306a, 308a, and 310s associated with each NTB port 306, 308, and 310, respectively, with "OK" messages, and then configure doorbell registers in the registers 306a, 308a, and 310s associated with each NTB port 306, 308, and 310, respectively, in order to send an interrupt to each of the route card processing system 318, the line card processing system 324, and the line card processing system 326. Upon receiving the interrupt, each of the route card processing system 318, the line card processing system 324, and the line card processing system 326 may change its program counter to point to the secondary processing system OS image address range in its route card memory system 320, line card memory system 328, and line card memory system 330, respectively, and begin the OS image boot process. As would be understood by one of skill in the art in possession of the present disclosure, this process may be performed in parallel for each secondary processing system with a direct connection to the primary processing system (e.g., by each of the route card processing system 318 and the line card processing systems 328 and 330 through their direct connections to the NTB ports 306, 308, and 310 on the management engine processing system 302 in FIG. 3), or may be performed sequentially for secondary processing systems sharing a connection to the primary processing system (e.g., by each of the route card processing system 318 and the line card processing systems 328 and 330 sequentially using the PCIe switch connection to the NTB ports 306, 308, and 310.

Thus, systems and methods have been described that provide for the connection of a primary processing system and secondary processing systems through a PCIe interconnect systems, along with the use of the ports connected to that PCIe interconnect systems and the registers associated with those ports in order to allow for the utilization of the primary memory system of the primary processing system and secondary memory systems of the secondary processing system to quickly provide the OS images for the secondary processing systems to their secondary memory systems for use in the startup/boot process. Utilizing the PCIe interconnect system and software handshake protocol described above, substantial improvements in system startup times may be realized. For example, the NTB ports of the primary and secondary processing systems may be connected via a first generation PCIe interconnect system that offers a bandwidth of 2.5 Gbps (250 MB/x) in each direction. While the effective bandwidth may drop due to PCI link layer and protocol overhead, given a max PCI payload size of 128 bytes, the effective bandwidth may still exceed 200 MB/s. If the OS image size is 30 MB, the systems and methods of the present disclosure may provide for the transfer of that OS image in well under a second, as compared to the 30 seconds that existing methods may require, thus achieving an order of magnitude improvement on system startup/boot times.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A multi-processor startup system, comprising:
   a Peripheral Component Interconnect (PCI) bus;
   a secondary processing system that is coupled to a secondary memory system and that includes a secondary processing system port that is connected to the PCI bus;
   a primary processing system that is coupled to a primary memory system and that includes a primary processing system port that is connected to the PCI bus and that is associated with at least one primary port register, wherein the primary processing system is configured to:
      retrieve a secondary processing system operating system (OS) image and store the secondary processing system OS image in the primary memory system;
      configure the at least one primary port register with an address mapping between the primary memory system and the secondary memory system; and
      copy the secondary processing system OS image to the secondary memory system by providing a write instruction to write the secondary processing system OS image to an address range included in the primary memory system, wherein the primary processing system port converts the write instruction using the address mapping such that the secondary processing system OS image is written over the PCI bus to the secondary memory system.

2. The multi-processor startup system of claim 1, wherein the primary processing system port and the secondary processing system port are Non-Transparent Bridge (NTB) ports.

3. The multi-processor startup system of claim 1, wherein the primary processing system is configured to:
   determine a size of the secondary processing system OS image; and
   configure the at least one primary port register with the size of the secondary processing system OS image.

4. The multi-processor startup system of claim 1, wherein the secondary processing system is configured to:
   determine a written checksum using the secondary processing system OS image that was written to the secondary memory system; and
   inform the primary processing system of the written checksum.

5. The multi-processor startup system of claim 4, wherein the primary processing system is configured to:
   determine a retrieved checksum using the secondary processing system OS image that was retrieved; and
   determine that the written checksum matches the retrieved checksum and, in response, send an instruction to the secondary processing system to load the secondary processing system OS image.

6. The multi-processor startup system of claim 1, wherein the primary processing system is configured to:
   discover the primary processing system port; and
   determine that the primary processing system port is associated with the secondary processing system and the address range of the primary memory system and, in response, provide the write instruction to write the secondary processing system OS image to the address range included in the primary memory system.

7. A switch, comprising:
   a Peripheral Component Interconnect (PCI) bus;
   a line card processor that is coupled to a line card memory system and that includes a line card processor port that is connected to the PCI bus;
   a management processor that is coupled to a management memory system and that includes a management processor port that is connected to the PCI bus and that is associated with at least one management port register, wherein the management processor is configured to:
      retrieve a line card operating system (OS) image and store the line card OS image in the management memory system;
      configure the at least one management port register with a mapping between the management memory system and the line card memory system; and
      provide a write instruction to write the line card OS image to an address range included in the management memory system, wherein the management processor port converts the write instruction using the address mapping such that the line card OS image is written over the PCI bus to the line card memory system.

8. The switch of claim 7, wherein the management processor port and the line card processor port are Non-Transparent Bridge (NTB) ports.

9. The switch of claim 7, wherein the management processor is configured to:
   determine a size of the line card OS image; and
   configure the at least one management port register with the size of the line card OS image.

10. The switch of claim 7, wherein the line card processor is configured to:
    determine a written checksum using the line card OS image that was written to the line card memory system; and
    inform the management processor of the written checksum.

11. The switch of claim 10, wherein the management processor is configured to:
    determine a retrieved checksum using the line card OS image that was retrieved; and
    determine that the written checksum matches the retrieved checksum and, in response, send an instruction to the line card processor to load the line card OS image.

12. The switch of claim 7, wherein the management processor is configured to:
    discover the management processor port; and
    determine that the management processor port is associated with the line card processor and the address range of the management memory system and, in response, provide the write instruction to write the line card OS image to the address range included in the management memory system.

13. The switch of claim 7, wherein the PCI bus is a PCI express bus.

14. A method for starting up a multi-processor system, comprising:

initializing a networking system that includes a primary processing system that is coupled to a secondary processing system by a Peripheral Component Interconnect (PCI) bus that extends between a primary processing system port on the primary processing system and a secondary processing system port on the secondary processing system;

retrieving, by the primary processing system, a secondary processing system operating system (OS) image and storing the secondary processing system OS image in a primary memory system of the primary processing system;

configuring, by the primary processing system, at least one primary port register for the primary processing system port with an address mapping between the primary memory system and a secondary memory system of the secondary processing system; and copying, by the primary processing system, the secondary processing system OS image to the secondary memory system by providing a write instruction to write the secondary processing system OS image to an address range included in the primary memory system, wherein the primary processing system port converts the write instruction using the address mapping such that the secondary processing system OS image is written over the PCI bus to the secondary memory system.

15. The method of claim 14, wherein the primary processing system port and the secondary processing system port are Non-Transparent Bridge (NTB) ports.

16. The method of claim 14, further comprising:

determining, by the primary processing system, a size of the secondary processing system OS image; and configuring, by the primary processing system, the at least one primary port register with the size of the secondary processing system OS image.

17. The method of claim 14, further comprising:

determining, by the secondary processing system, a written checksum using the secondary processing system OS image that was written to the secondary memory system; and informing, by the secondary processing system, the primary processing system of the written checksum.

18. The method of claim 14, further comprising:

determining, by the primary processing system, a retrieved checksum using the secondary processing system OS image that was retrieved; and determining, by the primary processing system, that the written checksum matches the retrieved checksum and, in response, sending an instruction to the secondary processing system to load the secondary processing system OS image.

19. The method of claim 14, further comprising:

discovering, by the primary processing system, the primary processing system port; and determining, by the primary processing system, that the primary processing system port is associated with the secondary processing system and the address range of the primary memory system and, in response, providing the write instruction to write the secondary processing system OS image to the address range included in the primary memory system.

20. The method of claim 14, wherein the PCI bus is a PCI express bus.

* * * * *